United States Patent [19]

Itabashi et al.

[11] Patent Number: 4,731,654
[45] Date of Patent: Mar. 15, 1988

[54] NONVOLATILE MEMORY SYSTEM FOR DIGITAL TELEVISION TUNER

[75] Inventors: Takao Itabashi, Tokyo; Junya Saito, Saitama; Norihito Ichikawa, Tokyo; Hisafumi Yamada, Kanagawa, all of Japan

[73] Assignee: Sony Corporation, Tokyo, Japan

[21] Appl. No.: 784,475

[22] Filed: Oct. 4, 1985

[30] Foreign Application Priority Data

Oct. 16, 1984 [JP] Japan ................... 59-217036

[51] Int. Cl.⁴ ............................ H04N 5/44; H04B 1/16
[52] U.S. Cl. .................... 358/188; 358/194.1; 455/186
[58] Field of Search .............. 358/188, 10, 903, 174, 358/191.1, 194.1, 160, 193.1; 455/181, 183, 184, 185, 186

[56] References Cited

U.S. PATENT DOCUMENTS 4,281,349  7/1981  George .................. 358/191.1
4,306,309  12/1981 Yasuda .................... 455/186
4,398,193  8/1983  Kuniyoshi ............... 455/186
4,591,914  5/1986  Hakamada ............. 358/194.1

FOREIGN PATENT DOCUMENTS 79587  6/1981  Japan .................... 358/188
111190  7/1982  Japan .................... 358/188

Primary Examiner—Tommy P. Chin
Attorney, Agent, or Firm—Lewis H. Eslinger; Alvin Sinderbrand

[57] ABSTRACT

A method and apparatus for use with a television receiver that processes a television signal in digital form and that has the functional units of the receiver controlled by digital data stored in internal registers, in which a dedicated non-volatile memory is provided for storing initial data along with a control circuit for setting such initial data into the appropriate register so that when the receiver is adjusted for the first time following manufacture spurious data will not cause circuit elements of the receiver to be damaged.

6 Claims, 4 Drawing Figures

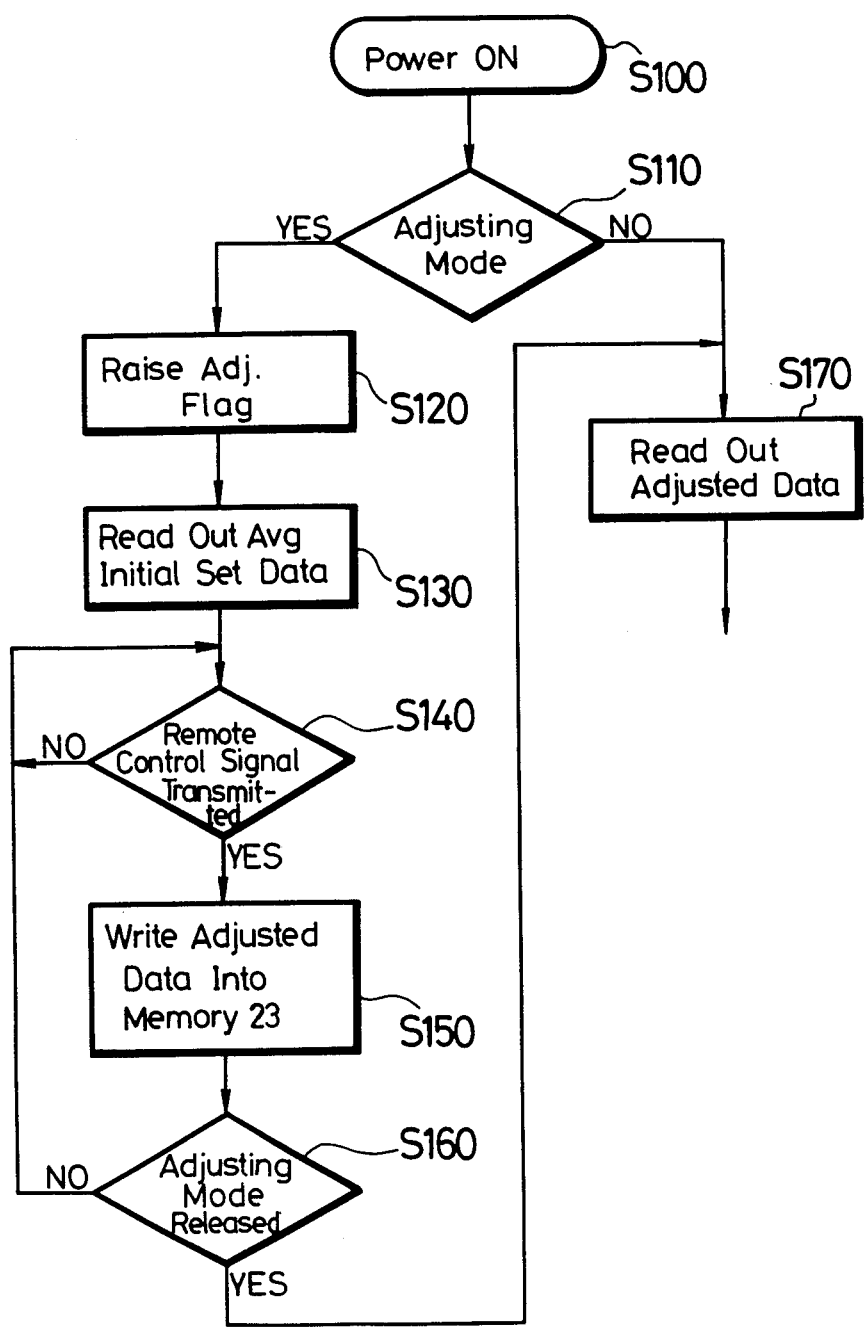

NONVOLATILE MEMORY SYSTEM FOR DIGITAL TELEVISION TUNER

BACKGROUND OF THE INVENTION

1. Field of the Invention

This invention relates generally to a television receiver and, more particularly, to apparatus for use with a digital television receiver to assure that it is initially adjusted properly following manufacture or repair.

2. Description of the Background

Presently color television receivers are known in which the majority of signal processing that takes place therein is carried out digitally. That is, the video signal is received in a conventional fashion using a known analog tuning circuit and then, following the tuning operation, the received analog television signal is converted to a digital signal and digitally processed before being subsequently converted back to an analog signal for display on a color cathode ray tube.

Although digital signal processing has many advantages over conventional analog signal processing, one problem that is presented by digital signal processing relates to the state of the circuitry at the time immediately following the manufacture of the set or following servicing of the set by a repair technician. Although conventional analog components and signal processing elements can be easily set to an appropriate value, such as a midpoint of a range, at the time of manufacture and such values will be held until later adjusted, digital circuits employing memory units, registers, and so forth do not have any initial settings and, indeed, cannot be initially set absent some sort of digital, pre-programming source. Examples of some of the various parameters that may be preset in the digital circuitry of a color television receiver are contrast, brightness, hue, color saturation degree, white balance, and perhaps most importantly, horizontal and vertical deflections. The problem being that if the television receiver is turned ON before appropriate initial values are set for the above-identified parameters, it is quite possible that the random or zero values present in the digital memories may be abnormal and outside of tolerated limits. Such abnormal values then would cause adverse influence on the appropriate circuit portions, for example, were the horizontal and vertical amplitudes increased or horizontal and vertical oscillation frequencies decreased drastically, there is a good likelihood that the horizontal or vertical output circuits will be destroyed.

OBJECTS AND SUMMARY OF THE INVENTION

Accordingly, it is an object of this invention to provide a television receiver having digital signal processing circuitry with preset initial values that can eliminate the above-noted defects inherent in the prior art.

Another object of this invention is to provide a digital television receiver having initial value setting apparatus, which can prevent circuit portions of the receiver from having undue signal levels and frequencies impressed thereon caused by abnormal initial settings.

It is still a further object of this invention to provide a digital television receiver in which memory units associated with one or more microcomputers utilized as part of the receiver are provided to accommodate the desired initial value settings, thereby to prevent damage to components of the receiver.

According to one aspect of the present invention, apparatus is provided for use with a digital television receiver in which the analog television signal is converted and digitally processed and is controlled by data stored in one or more registers, whereby a first memory is provided for storing initial data and then a control system is provided to set the initial data into the register the first time that the television receiver is adjusted subsequent to its manufacturing process. The initial data is statistically selected to be average data and the controller is so arranged to enter such data at the very first time the power switch is turned ON in the television receiver. Such specific data initialization can also occur following a servicing operation on the receiver.

The above and other objects, features, and advantages of the present invention will become apparent from the following detailed description of illustrative embodiments thereof to be read in conjunction with the accompanying drawings, in which like reference numerals indicate like elements or parts.

BRIEF DESCRIPTION OF THE DRAWINGS

FIG. 3 is a logical flow chart useful in explaining the operation of the modified digital television receiver of FIG. 2.

DETAILED DESCRIPTION OF THE PREFERRED EMBODIMENTS

Figure 1:
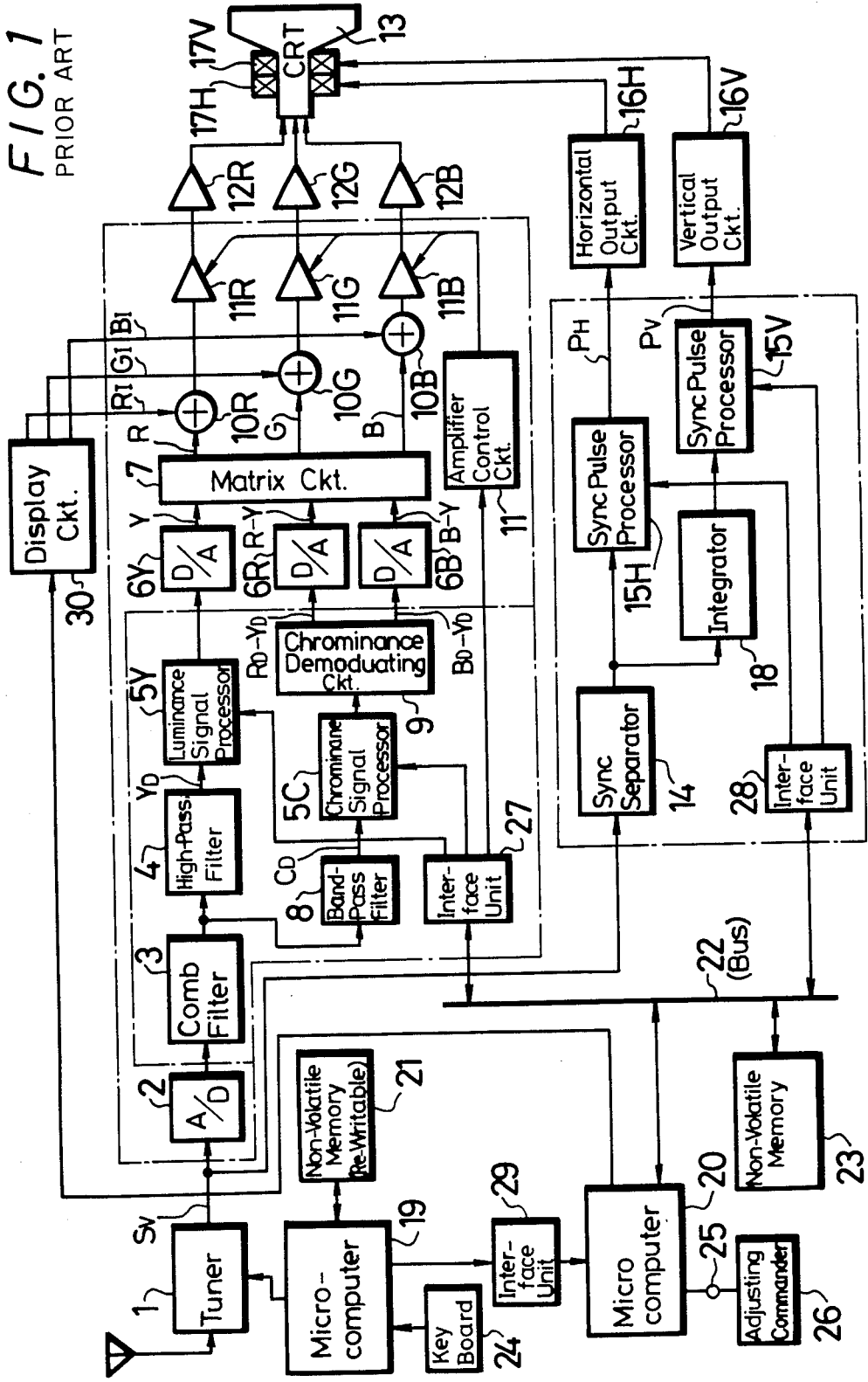
FIG. 1 is a schematic in block diagram form showing an example of a television receiver having digital signal processing capabilities known in the prior art.

A block diagram showing an example of a color television receiver known in the prior art, in which the majority of signal processing is carried out in a digital fashion, is shown in FIG. 1. The incoming television signal is received by an appropriate antenna or fed in through a cable to a tuner section 1 of the receiver. This tuner section 1 is only generally represented in FIG. 1, because the elements contained therein are conventional and form no part of the present invention. Nevertheless, assuming that tuner 1 contains the appropriate circuit elements up to the video detecting circuit, then tuner circuit 1 will be seen to produce the composite video signal Sv, which is converted to a digital signal by an appropriate analog-to-digital converter (A/D) 2. The digitally converted composite video signal is then fed to a comb filter 3 having an output signal fed to a digital high-pass filter 4, which thereby separates the digital luminance signal $Y_D$ from the composite digital video signal $S_v$. This digital luminance signal $Y_D$ is then fed to a luminance signal processor 5Y, wherein it is processed for contrast, gray scale values, and the like, as is known in conventional, digital, video signal processing. Thereafter, the processed digital luminance signal $Y_D$ is reconverted back to an analog luminance signal Y in digital-to-analog converter (D/A) 6Y and is then fed to a matrix circuit 7. The composite digital video signal from comb filter 3 is also fed to bandpass filter 8, which operates to separate the digital carrier chrominance signal $C_D$ from the composite video signal. This digital carrier chrominance signal $C_D$ is fed to a chrominance signal processor 5C, in which automatic color control, hue, color saturation degree, and so on are respectively adjusted. Thereafter, the adjusted digital chrominance signal $C_D$ is fed to a color demodulating circuit 9, which produces a digital red color difference signal $(R_D-Y_D)$ and a digital blue color difference signal $(B_D-Y_D)$. These red and blue color difference signals $(R_D-Y_D)$ and $(B_D-Y_D)$ are supplied to digital-to-analog converters (D/A) 6R and 6B, respectively, converted into analog color difference signals (R−Y) and (B−Y), respectively, and fed to matrix circuit 7. The outputs of matrix circuit 7 represent red (R), green (G), and blue (B) signals, which are then fed to a red adder 10R, a green adder 10G, and a blue adder 10B, in order to perform white balance. The outputs from these adders 10R, 10G, and 10B are respectively fed to brightness adjusting amplifiers 11R, 11G, and 11B, and the outputs from these amplifiers are fed to respective signal drive amplifiers 12R, 12G, and 12B to a conventional color picture tube or color cathode ray tube (CRT) 13 for display.

As in a conventional television receiver, the composite video signal from tuner 1 is also fed to a sync separator unit, which produces a sync pulse signal fed to a horizontal sync pulse processor 15H, in which is it converted to a horizontal sync pulse $P_H$ having a predetermined pulse width and predetermined phase and is then fed to a horizontal output circuit 16H. The output of horizontal output circuit 16H is the deflection signal fed to the horizontal deflection coil 17H, which is conventionally arranged on color cathode ray tube 13. Similarly, the output from sync separator 14 is also fed to an integrator 18, which produces a vertical sync pulse signal that is fed to a vertical pulse processing system 15V, in which it is converted to a vertical sync pulse signal $P_V$ that has a predetermined pulse width and phase. The vertical sync pulse signal $P_V$ is fed to a vertical output circuit 16V that produces the vertical deflection signal fed to vertical deflection coil 17V conventionally arranged on color cathode ray tube 13.

In modern television receivers and specifically in modern digital signal processing television receivers, it is known to utilize an internal microcomputer, or similar unit, for selecting the television channel and for controlling the overall operation of the television set. Thus, a microcomputer 19 is provided to control tuner 1 to select the appropriate channels, and another microcomputer 20 is provided for control of the overall television receiver. Input for the desired television channel, as well as other functions and operating modes of the television receiver is provided to microcomputer 19 by a key panel or keyboard 24, which may comprise a remote control unit or be a bank of switches on the front of the receiver. Typically, keyboard 24 is provided with a plurality of keys or buttons by which the user can select a channel for viewing and can adjust the contrast, brightness, hue, color saturation degree and the like of the picture being displayed. A non-volatile memory 21 is provided in association with microcomputer 19, so that the various values of contrast, brightness, hue, color saturation and the like that have been selected using keyboard 24 are retained, even after the power switch of the television receiver is turned OFF, thereby precluding the necessity to reset all of these various parameters each time the television receiver is operated anew.

The values stored in non-volatile memory 21, which of course is rewritable because the various values may be altered by use of the keyboard 24, are better thought of as offset values that represent differences from the respective standard values for these various picture parameters. These standard values for the parameters, such as contrast, brightness, hue, color saturation degree, and the like, are stored in a non-volatile separate memory 23. Also stored in memory 23 are other data, such as relating to white balance, horizontal deflection, vertical deflection, and so on, which need not be adjusted by the user but must, of course, be adjusted by the manufacturer at time the set is fabricated and also possibly by a service technician if the receiver requires servicing. The data that is to be stored in memory 23 is adjusted by means of an adjusting commander 26, which may be temporarily connected at terminal 25 to the microcomputer 20 when the set has completed the actual manufacturing and assembly process.

Thus, in accordance with the operation of the prior art digital television receiver shown in FIG. 1, when the main power switch of the television receiver is turned ON, microcomputer 19 operates to read from memory 21 the channel selection data, which had been selected prior to the time the power switch of the receiver was turned OFF. This data is then supplied to tuner circuit 1 to reselect the channel previously selected before the receiver was turned OFF. Additionally, microcomputer 19 reads the data of the various offset values relating to brightness and the like from non-volatile memory 21 and supplies such data through interface unit 29 to microcomputer 20. Microcomputer 20 also reads the data relative to the brightness, white balance, and horizontal and vertical deflection from memory 23, which data are then supplied through a bus 22 and appropriate interface unit 27 to an amplifier control circuit 11. The amplifiers 11R, 11G, and 11B are then controlled by amplifier control circuit 11, so that the three primary-color signals red (R), green (G), and blue (B) are adjusted appropriately to establish the brightness and white balance, as determined by the standard values retained in memory 23. Furthermore, microcomputer 20 reads from memory 23 the horizontal and vertical deflection data and supplies such data through a further interface unit 28 to the sync pulse processing circuits 15H and 15V, respectively, which act to adjust the horizontal and vertical deflections to the standard values as retained in memory 23.

Accordingly, it is seen that microcomputer 20 reads the data representing standard values of contrast, hue, color saturation degree, horizontal and vertical deflection and the like from memory 23. Then, the data representing the offset values and the data representing the standard values are added to each other and the summed data supplied through interface 27 to signal processing circuits 5Y and 5C, in which signals $Y_D$ and $C_D$ are respectively adjusted such that the predetermined contrast, hue, color saturation degree, and the like are obtained. Color cathode ray tube 13 then displays the television picture of the channel that had been selected when the power switch of the receiver was turned OFF, and such display is in the same state as previously selected prior to the termination of viewing. The data that is set into interface units 27 and 28 are latched in registers contained internally therein (not shown in FIG. 1) and such data is latched therein until new data is supplied to the respective interface unit.

The keyboard or key panel 24 may include numerous buttons or keys and when the user operates such keys, microcomputer 19 reads from memory 21 the data relating to the selected channel that has been previously set in memory 21 in accordance with the operated key. Typically ten keys are provided for channel selection.

This data is then fed to tuner circuit 1, so that it is placed in the channel selection state as designated by the appropriate keys of key panel 24. At that same time, the data corresponding to the selected channel is written in memory 21, in anticipation of the time when the power switch is turned OFF, so that when the receiver is turned back ON, this channel will be selected.

As a further example, each time the hue key on key panel 24 is depressed, the data relating to the offset value of the hue data stored in memory 21 is updated, and this updated, offset data is then supplied through interface unit 27 to the appropriate signal processing circuit, which in this case is chrominance signal processor 5C, which then adjusts the hue of the displayed picture accordingly.

Typically, in color television receivers of this kind, a display circuit is provided and in the example of FIG. 1 a display circuit 30 is used to display the selected channel on the screen of the color cathode ray tube 13 upon channel selection. Such display circuits are also frequently used to display the sound or audio volume level each time such volume is adjusted. The channel data and sound volume data for use by display circuit 30 are provided by microcomputer 19 through microcomputer 20. Thus, display circuit 30 produces red ($R_I$), green ($G_I$), and blue ($B_I$) primary color signals that are then supplied to adders 10R, 10G, 10B, respectively, so that the selected channel, or the selected sound volume, or the like, are displayed on the screen of the color cathode ray tube 13 superimposed on the television picture being presented for viewing.

As a note concerning the general manufacturing techniques involved in television receivers of the type shown typically in FIG. 1, the portions of the circuit diagram shown in FIG. 1 and enclosed by single-dot chain lines are each typically formed on one integrated circuit chip. These chips are then used to fabricate commercial television receivers. One source for these chips is the International Telephone and Telegraph Corporation (ITT) and, in that regard, attention is directed to the brochure "DIGIT 2000 VLSI Digital TV System," published by ITT.

In the receiver of FIG. 1, the data stored in memory 23 is read out therefrom by microcomputer 20 each time that the power switch of the television receiver is turned ON. Then, in accordance with that data the respective signal processing circuits, 5Y and 5C, the pulse processing circuits, 15H and 15V, and so on are preset initially or, stated another way, are initialized. This situation poses no problem, because once the initially preset data is contained in memory 23 it can be read out appropriately each time the power switch of the receiver is turned ON. Nevertheless, there is a serious problem when the power switch of the television receiver is turned ON in the adjusting mode when there is no initially preset data in memory 23. This situation can occur at the time the standard value data is to be written into memory 23 by adjusting commander 26, that is, at the time the set has finally completed manufacture. In other words, at the time when the power switch of the receiver is first turned ON in the adjusting mode there is nothing stored in memory 23 or, indeed if there is anything stored there it is only random data, the values of the respectively circuit parameters may well be, and quite frequently are, set at abnormal, nonfunctional values. This then raises the serious question that an undue influence can be exerted upon the respective circuit portions and seriously damage such circuits. For example, if the horizontal and vertical amplitudes are caused to be increased by such abnormal data, or if the horizontal and vertical oscillation frequencies are drastically decreased by such random or abnormal data, there is a very real chance that the horizontal output circuit and vertical output circuit could be destroyed.

Accordingly, the present invention then provides a system to prevent any possibility that the various circuit elements or circuit sections of the receiver could be damaged by such abnormal pre-initialization values that might be contained within the various digital memories and registers in the system.

Figure 2:
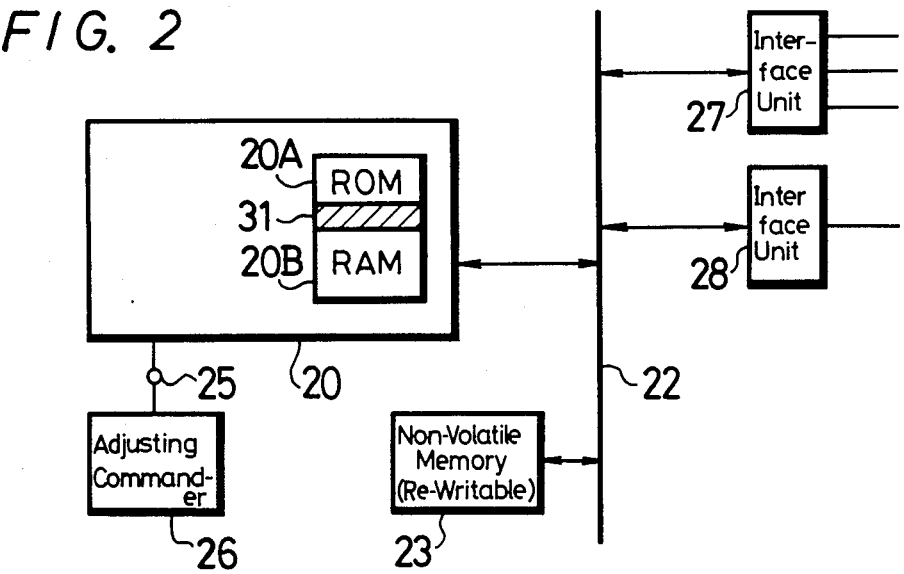
FIG. 2 is a schematic in block diagram form showing a portion of the embodiment of the television receiver of FIG. 1 modified according to the present invention.

Referring to FIG. 2, a read only memory (ROM) 20A and a random access memory (RAM) 20B are provided as part of microcomputer 20. Moreover, in this embodiment, a part of read only memory 20A is provided as a storage region 31 in which an average initial setting data that corresponds to each of the various data points to be ultimately stored in memory 23 has been previously written and retained. The data stored in region 31 of read only memory 20A cannot be rewritten and is selected to be common to each set or receiver of this specific kind, that is, to all models within a specific model line.

In this embodiment, the circuit of FIG. 2 is operated in accordance with a selected method represented by a routine shown in the flow chart of FIG. 3. Referring to FIG. 3, after the power switch of the television receiver is turned ON, as represented in step S100, it is determined in step S110 whether the adjusting mode is present or not. For example, when adjusting commander 26 is connected at connector 25 of microcomputer 20, it is judged that the television receiver is in the adjusting mode. If the receiver is judged to be in that adjusting mode, then the method proceeds to step S120, in which an adjusting flag is raised to indicate that the adjusting mode is present, and the routine proceeds to step S130, in which the average, initial, standard data for each circuit portion, which has been stored in region 31 of read only memory 28, is read out therefrom and set in each of the respective circuit portions of the receiver. When such data has been completely read out from section 31 of read only memory 20A, the method moves to step S140, at which it is determined or judged whether the remote control signal is being transmitted from the adjusting commander 26. If such remote control signal is being transmitted from adjusting commander 26, then each circuit portion is adjusted appropriately and the data for each of the circuit portions is written into memory 23. This writing of the data into memory 23 occurs at step S150. Once the adjusted data has been written into memory 23 the method proceeds to step S160, at which it is judged whether the television receiver remains in the adjusting mode. Releasing of the adjusting mode may be accomplished by operating an adjusting end key, for example, an EXIT key on adjusting commander 26 is typically provided, whereby the adjusting mode flag is turned OFF and the adjusting mode is released. If the adjusting mode is determined to be released, the method moves to step S170, at which the data that was written in during the adjusting mode is read out from memory 23 and such data is then set in each circuit portion appropriately. On the other hand, if the adjusting mode is judged not to be released, then step S160 indicates that method step S140 and the subsequent steps are to be repeated. The method steps schematically depicted in FIG. 3 are provided by way of example only and, of course, other embodiments of this method could be provided following the teaching of this invention to accommodate embodiments of digital television receivers that differ from the example of FIG. 1.

According to the embodiment described above, when the power switch of the television receiver is turned ON in the adjusting mode, the average initial values that are set into the respective parts of each of the circuit portions are those corresponding to the data that had been previously stored in region 31 of read only memory 20A. Whereby, even if the initial set data is not already written in memory 23, no circuit section can ever be set to an abnormal value and there is no possibility that any circuit section can be damaged or destroyed.

Figure 4:
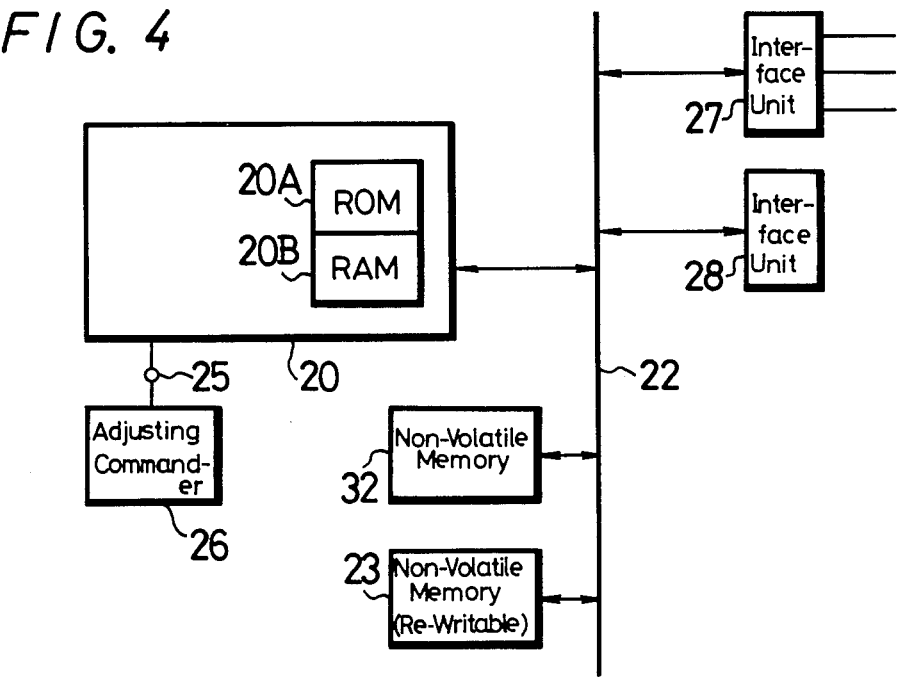
FIG. 4 is a schematic in block diagram form of another embodiment according to the present invention.

Another embodiment of the present invention is represented by the block diagram of FIG. 4, which shows only the portions of the television receiver that relate to the present invention. In the embodiment of FIG. 4, a non-volatile memory 32, which contains an average predetermined set data corresponding to the data written into memory 23, is arranged outside of microcomputer 20 and is connected to data bus 22. Thus, in this embodiment when the power switch of the television receiver is turned ON in the adjusting mode, the average initial set data of the respective circuit sections is derived from this external non-volatile memory 32, not from the fixed portion 31 of internal read only memory 20A, and is then set into each circuit section appropriately. It will be clear that in accordance with the embodiment of FIG. 4, the exact same operation and effects are possible as those described above in relation to FIG. 2 following the method depicted in FIG. 3.

The above description is provided for selected embodiments of the invention, however, it will be apparent that many modifications and variations could be effected by one skilled in the art without departing from the spirit or scope of the novel concepts of the invention, which should be determined only by the appended claims.

What is claimed is:

1. Apparatus for use with a television receiver that processes a television signal in digital form under control of digital data stored in at least one register of the receiver, the apparatus comprising:
    first memory means operably connected to the television receiver for storing predetermined, display parameter, receiver initialization data an comprising a read only memory, in which a protion of said read only memory containing said predetermied, display parameter, receiver initialization data is non-volatile and non-rewritable;
    manually operable means for producing adjusting data used in control of the television receiver;
    second memory means connected to store said adjusting data from said manually operable mean, whereby processing of the television signal is also under control of the adjusted data and in which said second memory means comprises first and second non-volatile memories, said first non-volatile memory being arranged to store a predetermined standard value of data and said second non-volatile memory being arranged to store an offset value of data, said adjusted data being comprised of a sum of said standard data and said offset data; and
    control means connected to said first and second memory means and to said television receiver for controlling said first and second memory means and said at least one register to set said predetermined, display parameter, receiver initialization data stored in said first memory means into said at least one register, at a first time the television receiver is operated.

2. A method for use with a television receiver that processes a television signal in digital form under cofntrol of digital data stored in a register of the television receiver and including an adjusting controller, the method comprising the steps of:
    providing a non-volatile, non-rewritable memory containing initial set data;
    determining whether the television receiver is in an adjusting mode; and
    reading out the initial set data from the provided memory into the register of the television receiver when the television receiver is determined to be in the adjusting mode for controlling the television receiver in accordance with the initial set data at a first time power is applied thereto.

3. A method according to claim 2, including the step of providing said initial set data by statistically determining average values for such data.

4. A method according to claim 2, including the further step of providing a data flag indicating the presence of the adjusting mode upon affirmative determination thereof.

5. A method according to claim 2, in which the television receiver includes a non-volatile rewritable memory and including the further steps of:
    using the adjusting controller to enter adjsuted data into the rewritable memory; and
    adjusting the initial set data in the register in accordance with the adjusted data in the rewritable memory.

6. Apparatus for processing a digital television signal in a television receiver, which is controlled by digital data stored in at least one register of the receiver, the apparatus comprising:
    first memory means containing predetermined initial, display parameter, contorl data and being connected to the television receiver for use in initially controlling the television receiver and comprising a read only memory in which said initial, dispaly parameter, control data is contained in a portion thereof that is non-volatile and non-rewritable;
    manually actuable means for providing adjusting data to control the television receiver;
    second memory means connected to store the adjusting data from said manually actuable means, whereby the television receiver is controlled by the adjusted data and in which said second memory means comprises first and second non-volatile memories, said first non-volatile memory being arranged to store a predetermined standard value of the data and said second non-volatile memory being arranged to store an offset value of the data, said adjusted data being comprised of a sum formed of said standard data and said offset data; and
    control means connected to said first and second memory means and to said television receiver for controlling said firt and second memory means and said at least one register to set said initial, display parameter, control data stored in said first memory means into said at least one register the first time the television receiver is operated.

* * * * *

UNITED STATES PATENT AND TRADEMARK OFFICE
CERTIFICATE OF CORRECTION

PATENT NO. : 4,731,654
DATED : March 15, 1988
INVENTOR(S) : Takao Itabashi et al.

It is certified that error appears in the above-identified patent and that said Letters Patent is hereby corrected as shown below:

Column 3, line 6, change "$(B_D-_{YD})$" to -- $(B_D-Y_D)$ --.

IN CLAIMS

Column 7, line 48, change "an" to -- and --;

line 56, change "mean" to -- means --.

Column 8, line 8, change "cofn-" to -- con- --;

line 32, change "adjsuted" to --adjusted --;

line 45, change "dispaly" to -- display --.

Signed and Sealed this

Tenth Day of January, 1989

Attest:

DONALD J. QUIGG

Attesting Officer

Commissioner of Patents and Trademarks